(12) United States Patent
Lee et al.

(10) Patent No.: US 11,884,330 B1
(45) Date of Patent: Jan. 30, 2024

(54) VEHICLE FRAME STRUCTURE

(71) Applicants: HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Dae Ki Jeong, Hwaseong-si (KR); Su Jin Lee, Seoul (KR); Jong Chan Baek, Hwaseong-si (KR); Byung Joo Chung, Gunpo-si (KR); Dong Ho Lee, Seongnam-si (KR); Seung Hak Lee, Asan-si (KR); Yeon Seo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/100,968

(22) Filed: Jan. 24, 2023

(30) Foreign Application Priority Data

Sep. 21, 2022 (KR) .......................... 10-2022-0119493

(51) Int. Cl.
*B62D 24/04* (2006.01)
*B62D 63/02* (2006.01)
*B62D 25/02* (2006.01)

(52) U.S. Cl.
CPC ............. *B62D 24/04* (2013.01); *B62D 25/02* (2013.01); *B62D 63/025* (2013.01)

(58) Field of Classification Search
CPC .... B62D 24/04; B62D 63/025; B62D 21/155; B62D 25/08
See application file for complete search history.

(56) References Cited

U.S. PATENT DOCUMENTS

| | | | |
|---|---|---|---|
| 7,237,829 B2 * | 7/2007 | Latimer, III | B62D 25/2036 296/187.11 |
| 11,046,365 B2 * | 6/2021 | Rosepiler | B62D 21/11 |
| 11,472,483 B2 * | 10/2022 | Catena | B62D 21/152 |

(Continued)

FOREIGN PATENT DOCUMENTS

| | | |
|---|---|---|
| JP | 2010018052 A | 1/2010 |
| JP | 2014201072 A | 10/2014 |

(Continued)

*Primary Examiner* — Faye M Fleming
(74) *Attorney, Agent, or Firm* — Lempia Summerfield Katz LLC

(57) ABSTRACT

A vehicle frame structure includes: an inner panel connected to a side member and defining the inside of the side member; an outer panel connected to the side member and coupled to the inner panel forming a closed section with the inner panel and defining the outside of the side member; an opening formed in lower sides of the inner panel and outer panel to partially open the closed section such that a front end of a rear suspension arm can be inserted therein; a first reinforcement member provided in the opening forming a first closed portion with the inner panel; and a second reinforcement member provided in the opening forming a second closed portion with the inner panel, the outer panel, and the first reinforcement member and to isolate a space formed by the inner panel and the outer panel from an outer portion.

17 Claims, 15 Drawing Sheets

(56) References Cited

U.S. PATENT DOCUMENTS

| | | | |
|---|---|---|---|
| 11,661,115 B2 * | 5/2023 | Rose | B62D 25/2018 296/193.02 |
| 2017/0217495 A9 | 8/2017 | Taguchi | |
| 2021/0331749 A1 | 10/2021 | Hwang et al. | |
| 2023/0227105 A1 | 7/2023 | Lee et al. | |

FOREIGN PATENT DOCUMENTS

| | | | | |
|---|---|---|---|---|
| JP | 2017178244 A | | 10/2017 | |
| JP | 2020138632 A | | 9/2020 | |
| JP | 2022103607 A | | 7/2022 | |
| KR | 20080052063 A | * | 6/2008 | B60G 7/001 |
| KR | 20210130883 A | | 11/2021 | |
| KR | 20230111947 A | | 7/2023 | |

* cited by examiner

VEHICLE FRAME STRUCTURE

CROSS-REFERENCE TO RELATED APPLICATION

This application is based on and claims priority under U.S.C. 119 to Korean Patent Application No. 10-2022-0119493, filed on Sep. 21, 2022, in the Korean Intellectual Property Office, the disclosure of which is herein incorporated by reference in its entirety.

BACKGROUND

1. Field of the Disclosure

The present disclosure relates to a technology regarding a vehicle frame structure.

2. Description of the Prior Art

A purpose built vehicle (PBV) includes a life module configured to form various types of boarding and loading spaces according to market demands, and a drive module related to substantial vehicle driving. Therefore, various kinds of vehicles can be easily produced by coupling life modules according to various demands to specific types of drive modules, thereby effectively following the market trend toward making many kinds of vehicles in low volumes.

The rear-wheel suspension of a conventional vehicle uses separate brackets outside side members of the vehicle frame such that the front side of the suspension can be supported. However, in the case of a PBV or an electric car having a high-voltage battery (hereinafter, simply referred to as a "battery") mounted on the lower side of the vehicle, the interval or spacing between both side members of the frame is increased to improve the ability to mount the battery. It is thereby difficult to support the front side of the rear-wheel suspension outside the side members as in the case of the prior art.

The above descriptions regarding background technologies have been made only to help in understanding the background of the present disclosure. The above descriptions are not to be deemed by those of ordinary skill in the art to correspond to already-known prior art.

SUMMARY

It is an aspect of the present disclosure to provide a vehicle frame structure wherein, in connection with a frame applied to a PBV or an electric car having a battery mounted on the lower side of the vehicle, the front side of a rear-wheel suspension can be fixed to the frame in a compact and robust manner without protruding out from the vehicle. The frame structure thereby secures improved mounting of the battery of the vehicle and provides excellent rigidity against rear-end collisions of the vehicle.

In accordance with an aspect of the present disclosure, a vehicle frame structure may include an inner panel connected to a rear side of a middle part of a side member so as to constitute the inside of a rear part of the side member. The frame structure may also include an outer panel connected to the rear side of the middle part of the side member and coupled to the outside of the inner panel so as to form a closed section with the inner panel and to constitute the outside of the rear part of the side member. The frame structure may further include an opening formed in lower sides of the inner panel and the outer panel so as to partially open the closed section formed by the inner panel and the outer panel such that a front end of a rear suspension arm can be inserted therein. The frame structure also includes a first reinforcement member provided in the opening so as to form a first closed portion with the inner panel and includes a second reinforcement member provided in the opening so as to form a second closed portion with the inner panel, the outer panel, and the first reinforcement member and to isolate a space formed by the inner panel and the outer panel from an outer portion.

The opening may be formed in a lower side of a kickup portion bent upwards from a portion of the rear part of the side member, which is connected to the middle part.

The first reinforcement member may be installed to form a first long closed section, i.e., the first closed portion, in a direction parallel to the inner panel.

The second reinforcement member may be installed to form a second long closed section, i.e., the second closed portion, in a direction perpendicular to the outer panel and the inner panel.

A nut may be provided between the first reinforcement member and the inner panel such that a fastening bolt is fastened thereto so as to support an end of the rear suspension arm.

The nut may have an end coupled to a side surface of the first reinforcement member through the inner panel.

The first reinforcement member may be formed in a flat plate shape to be longer than the second reinforcement member in the forward/backward direction of the vehicle. The first reinforcement member may have flanges provided on upper and lower sides thereof and bent toward the inner panel, respectively.

The second reinforcement member may include: a front portion coupled to the outer panel and the first reinforcement member so as to block the front side of the opening; a rear portion coupled to the outer panel and the first reinforcement member so as to block the rear side of the opening; and a middle portion connecting the front portion and the rear portion.

Each of the front portion, the middle portion, and the rear portion of the second reinforcement member may have a flat plate shape. With reference to the middle portion, each of the front portion and the rear portion may be shaped to bend downwards.

The second reinforcement member may have flanges provided on both sides thereof so as to bend downwards, respectively. One flange may make surface contact with the first reinforcement member. Another flange may make surface contact with the outer panel. The front portion may have a front end bent forwards and the rear portion may have a rear end bent backwards.

A third reinforcement member may be installed in front of the front portion of the second reinforcement member and may be elongate in the forward/backward direction while being spaced apart from the first reinforcement member.

In accordance with another aspect of the present disclosure, a vehicle frame structure may include: an opening provided in a lower side of a rear kickup portion of a side member; a first reinforcement member configured to form a barrier in the upward/downward direction inside the opening; and a second reinforcement member configured to form a barrier in the transverse direction inside the opening. The first reinforcement member and the second reinforcement member may form a space inside the opening such that the front end of a rear suspension is rotatably supported.

The side member may form a closed surface by coupling between an inner panel positioned relative to an inside of the vehicle and an outer panel positioned relative to an outside of the vehicle. The opening may be formed to partially open a closed section formed by the inner panel and the outer panel. The first reinforcement member may form a first closed portion within the closed section with the inner panel inside the opening. The second reinforcement member may form a second closed portion within the closed section with the outer panel, the inner panel, and the first reinforcement member inside the opening.

The first reinforcement member may be formed to be longer than the opening in the forward/backward direction of the vehicle. The second reinforcement member may include a front portion configured to block the front side of the opening, a rear portion configured to block the rear side of the opening, and a middle portion configured to connect the front portion and the rear portion.

The front portion, the middle portion, and the rear portion of the second reinforcement member may be formed by successively bent flat plate shapes, respectively, and both sides thereof may be coupled to the outer panel and the first reinforcement member, respectively.

A nut may be provided between the first reinforcement member and the inner panel and may be coupled to a side surface of the first reinforcement member through the inner panel. A fastening bolt may be fastened to the nut so as to penetrate a rear suspension from the outer panel.

A third reinforcement member may be provided in front of the second reinforcement member and may be elongate in the forward/backward direction while being spaced apart from the first reinforcement member in the transverse direction.

The present disclosure reveals a vehicle frame structure that is advantageous. For example, in connection with a frame applied to a PBV or an electric car having a battery mounted on the lower side of the vehicle, the front side of a rear-wheel suspension can be fixed to the frame in a compact and robust manner without protruding out from the vehicle. Excellent or improved mounting of the battery of the vehicle is secured and excellent or improved rigidity against rear-end collisions of the vehicle is provided.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION OF EMBODIMENTS

Figure 1:
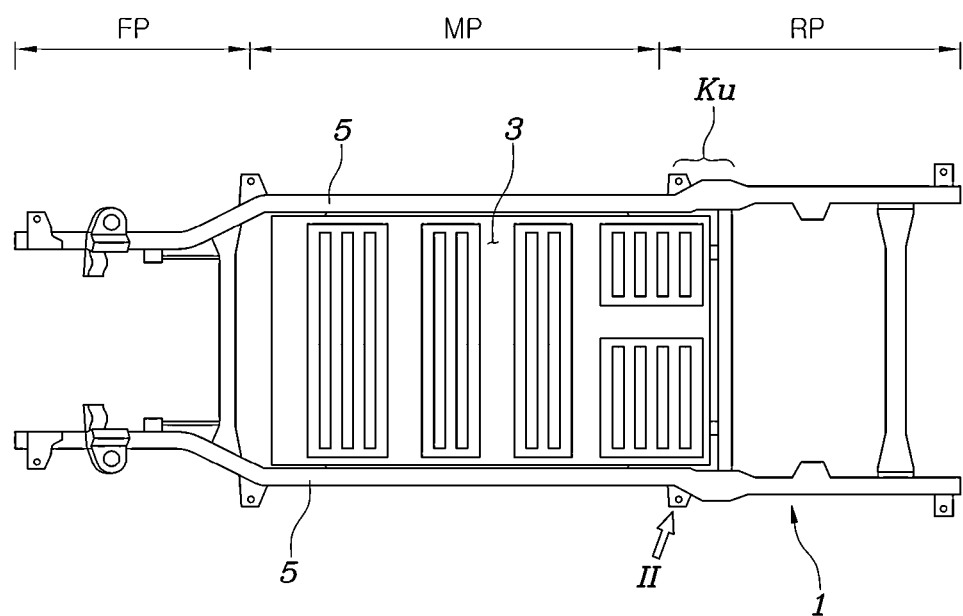
FIG. 1 is a top view of a vehicle frame structure to which the present disclosure is applied.

Hereinafter, embodiments disclosed in the present specification are described in detail with reference to the accompanying drawings. The same or similar elements are given the same reference numerals, and thus duplicate descriptions thereof have been omitted.

The terms "module", "member," "portion," "part," "unit," and the like, which are used for the elements in the following description are given or interchangeably used in consideration of only the ease of writing the specification. thus, such terms do not have or infer distinct meanings or roles by themselves.

In describing the embodiments disclosed in the present specification, when the detailed description of the relevant known technology is determined to unnecessarily obscure the gist of the present disclosure, the detailed description has been omitted. Further, the accompanying drawings are provided only to aid in understanding the embodiments disclosed in the present specification. The technical spirit of the embodiments disclosed herein is not limited to the accompanying drawings. It should be understood that all changes, equivalents, or substitutes thereof are included in the spirit and scope of the present disclosure.

Terms including an ordinal number such as "first", "second", or the like may be used to describe various elements, but the elements are not limited by the terms. The above terms are used only for the purpose of distinguishing one element from another element.

In the case where an element is referred to as being "connected" or "coupled" to any other element, it should be understood that another element may be provided therebetween, and also that the element may be directly connected or coupled to the other element. In contrast, in the case where an element is "directly connected" or "directly coupled" to any other element, it should be understood that no other element is present therebetween.

A singular expression may include a plural expression unless they are definitely different in context. When a component, device, member, element, or the like of the present disclosure is described as having a purpose or performing an operation, function, or the like, the component, device, member, or element should be considered herein as being "configured to" meet that purpose or perform that operation or function.

As used herein, the expressions "include," "comprise," or "have" and variations thereof are intended to specify the existence of mentioned features, numbers, steps, operations, elements, components, or combinations thereof. Such expressions should be construed as not precluding the possible existence or addition of one or more other features, numbers, steps, operations, elements, components, or combinations thereof.

FIG. 1 illustrates a vehicle frame structure to which the present disclosure is applied. The frame 1 may be divided into a front part FP, a middle part MP, and a rear part RP along the longitudinal direction of the vehicle. A battery 3 is illustrated as being mounted inside the middle part MP.

Referring to FIGS. 1-15, the vehicle frame structure according to the present disclosure includes an inner panel 7 connected to the rear side of the middle part MP of a side member 5 so as to constitute the inside of the rear part RP of the side member 5. The vehicle frame structure also includes an outer panel 9 connected to the rear side of the middle part MP of the side member 5 and coupled to the outside of the inner panel 7 so as to form a closed section with the inner panel 7 and to constitute the outside of the rear part RP of the side member 5. The frame structure also includes an opening 11 formed in lower sides of the inner panel 7 and the outer panel 9 so as to partially open the closed section formed by the inner panel 7 and the outer panel 9. The front end of a rear suspension arm 17 can be inserted therein (see FIG. 3). The frame structure further includes a first reinforcement member 13 provided in the opening 11 and configured to form a first closed portion within the closed section with the inner panel 7. The frame structure further includes a second reinforcement member 15 provided in the opening 11 and configured to form a second closed portion of the closed section with the inner panel 7, the outer panel 9, and the first reinforcement member 13 and to isolate and divide the space, i.e., the closed section, formed by the inner panel 7 and the outer panel 9 from the outside.

In other words, according to the present disclosure, the opening 11 is formed in the rear part RP connected to the rear side of the middle part MP of the side member 5. The front side of the rear suspension arm 17 is fixed while the first reinforcement member 13 and the second reinforcement member 15 are provided in the opening 11.

In the present embodiment, the opening 11 is formed in the lower side of a kickup portion Ku that bends upward from the portion of the rear part RP of the side member 5, which is connected to the middle part MP.

Figure 2:
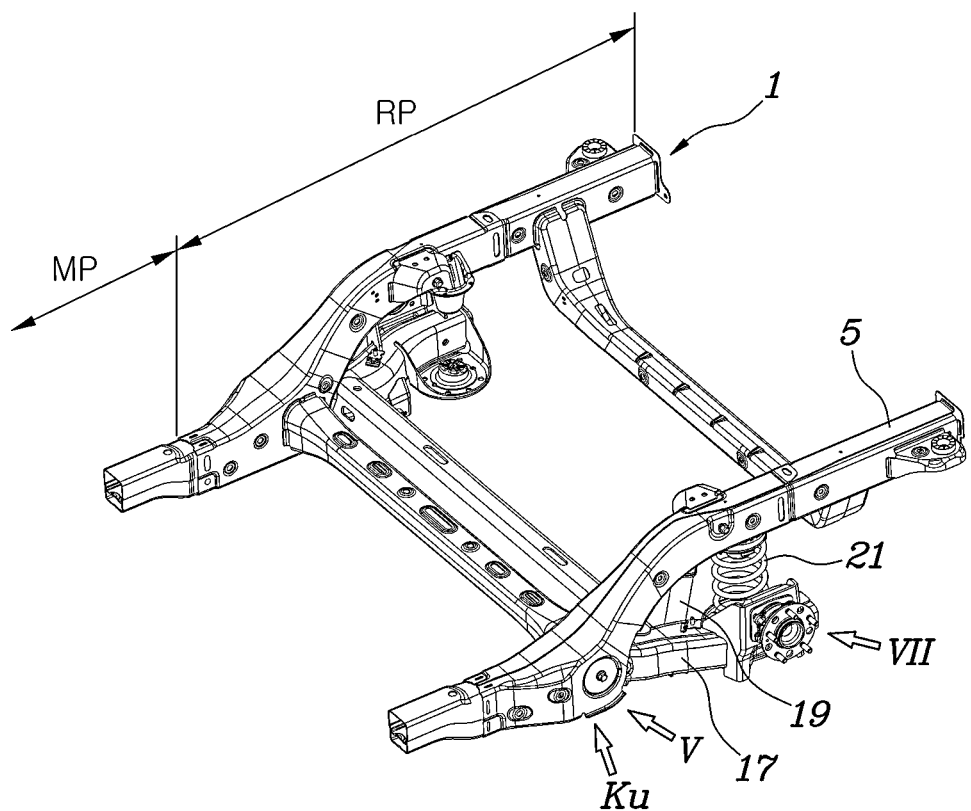
FIG. 2 is a perspective view of the frame structure seen in direction II in FIG. 1.
Figure 3:
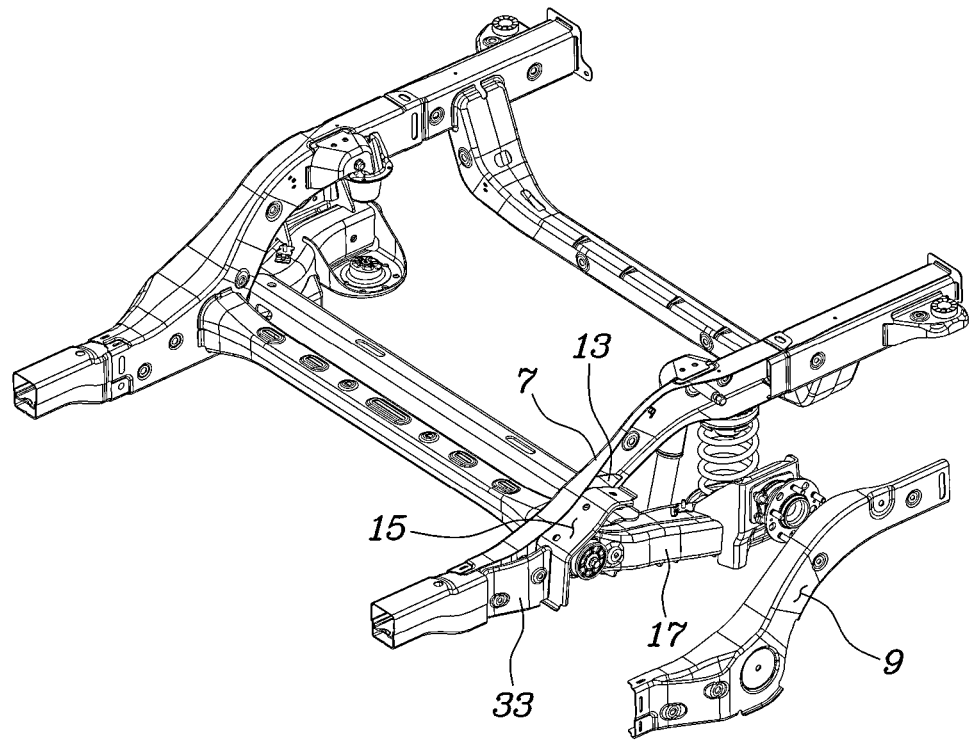
FIG. 3 illustrates a state after separating an outer panel from the frame structure in FIG. 2.
Figure 4:
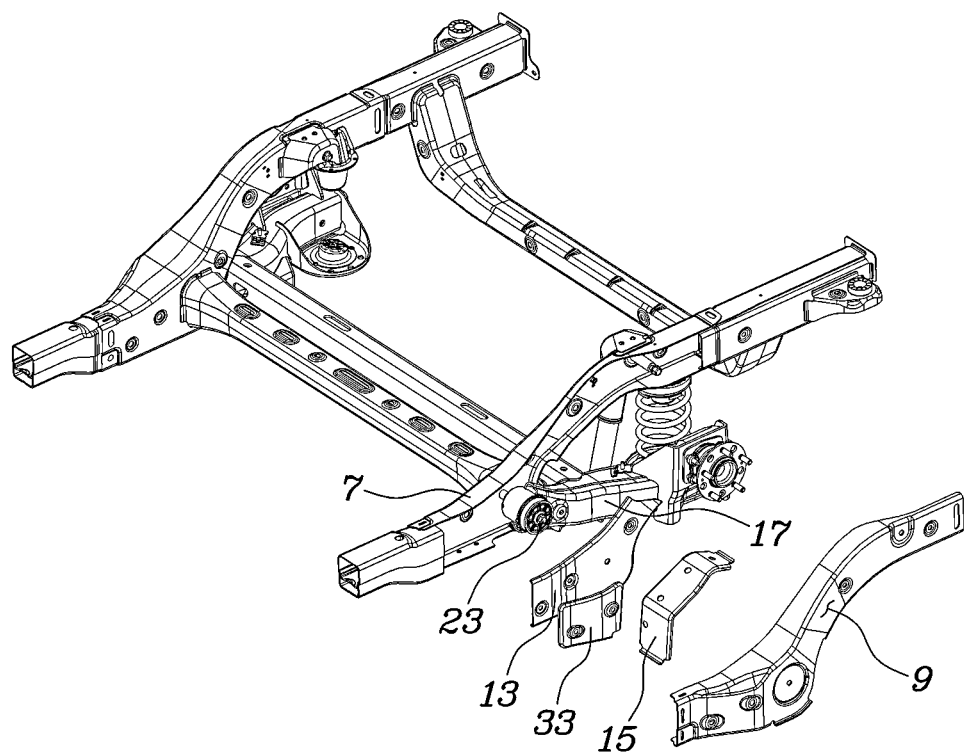
FIG. 4 illustrates a state after separating a first reinforcement member, a second reinforcement member, and a third reinforcement member from the frame structure in FIG. 3.

Therefore, the rear suspension arm 17 may be installed to be substantially horizontal along the forward/backward direction of the vehicle without excessively inclining toward the lower side of the vehicle. Also, as illustrated in FIG. 2, a shock absorber 19 and a spring 21 of the rear suspension may be installed between the rear suspension arm 17 and the rear part RP of the side member 5, thereby implementing a rear suspension in an appropriate structure.

Although the opening 11 provides access to a space in the closed section in which the rear suspension arm 17 can be fixed, structural rigidity may be degraded by the structure that partially opens the closed section formed by the inner panel 7 and the outer panel 9. Therefore, if the vehicle undergoes a rear-end collision, for example, the side member 5 may be severely deformed near the opening 11.

However, according to the present disclosure, the first reinforcement member 13 and the second reinforcement member 15 secure sufficient rigidity near the opening 11. Thus, even if the vehicle undergoes a rear-end collision as described above, sufficient rigidity suppresses deformation of the side member 5 and provides excellent or satisfactory performance for handling rear-end collisions. In addition, an optimal space to install the rear suspension arm 17 is provided in the closed section.

Figure 6:
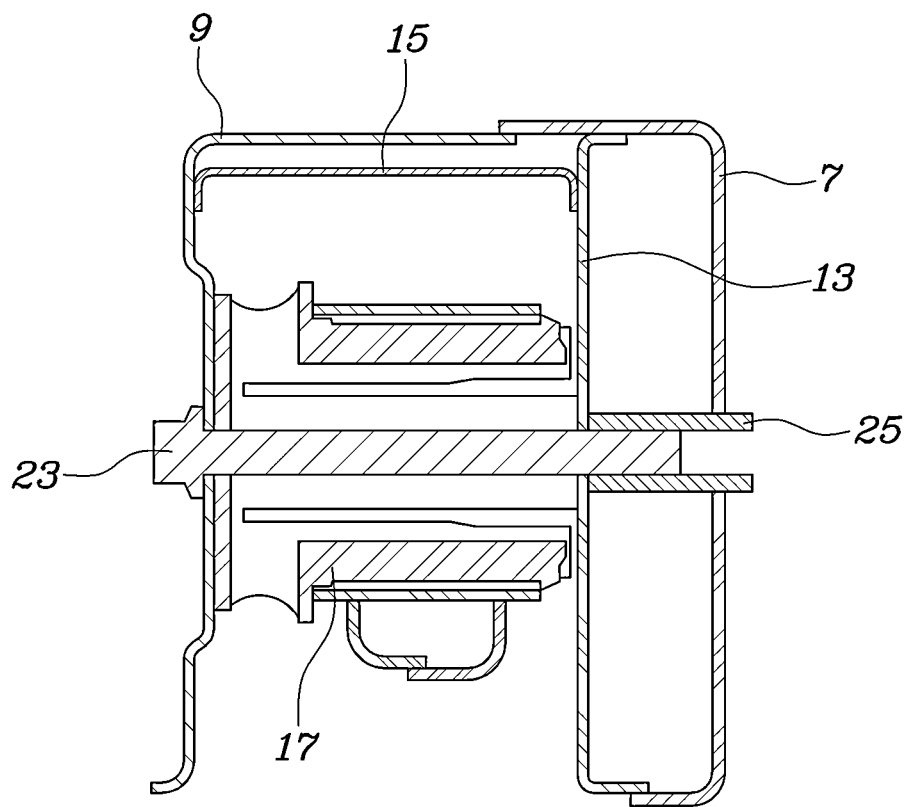
FIG. 6 is a sectional view taken along line VI-VI in FIG. 5.
Figure 7:
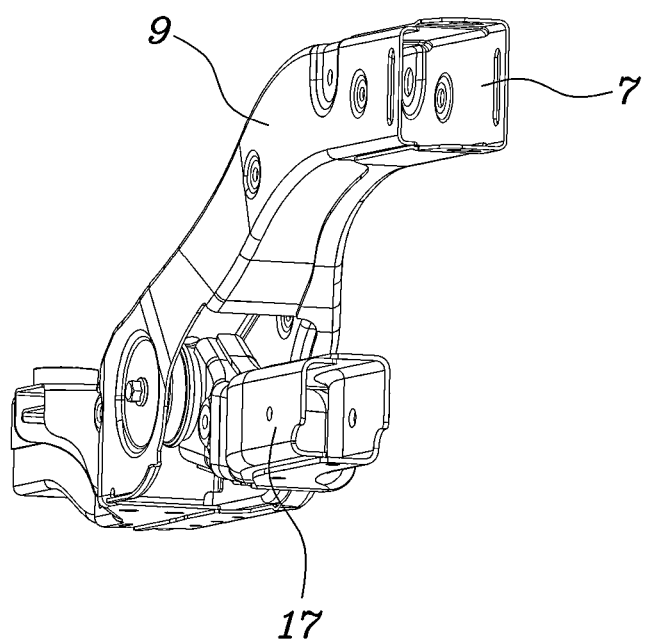
FIG. 7 is a view of part of the frame structure seen in direction VII in FIG. 5.
Figure 8:
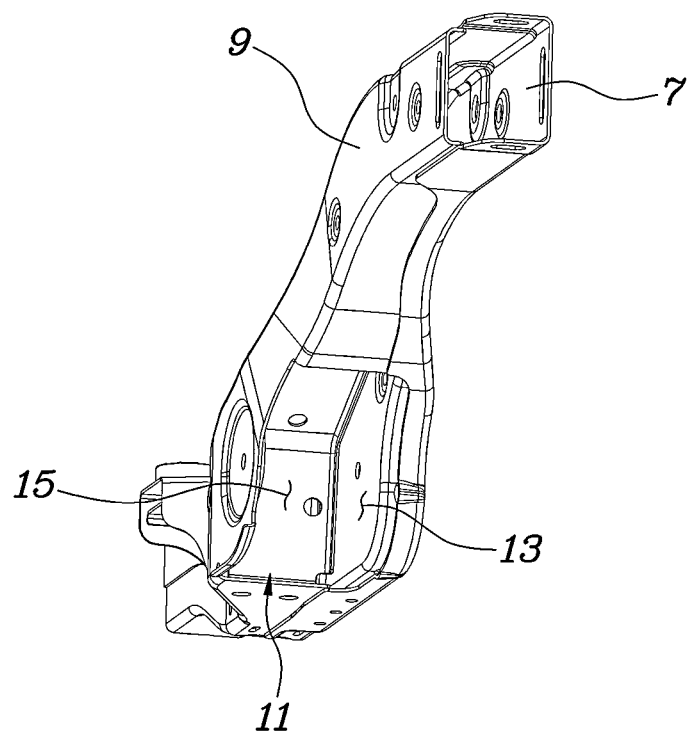
FIG. 8 illustrates a state after separating a rear suspension arm from the part of the frame structure in FIG. 7.
Figure 9:
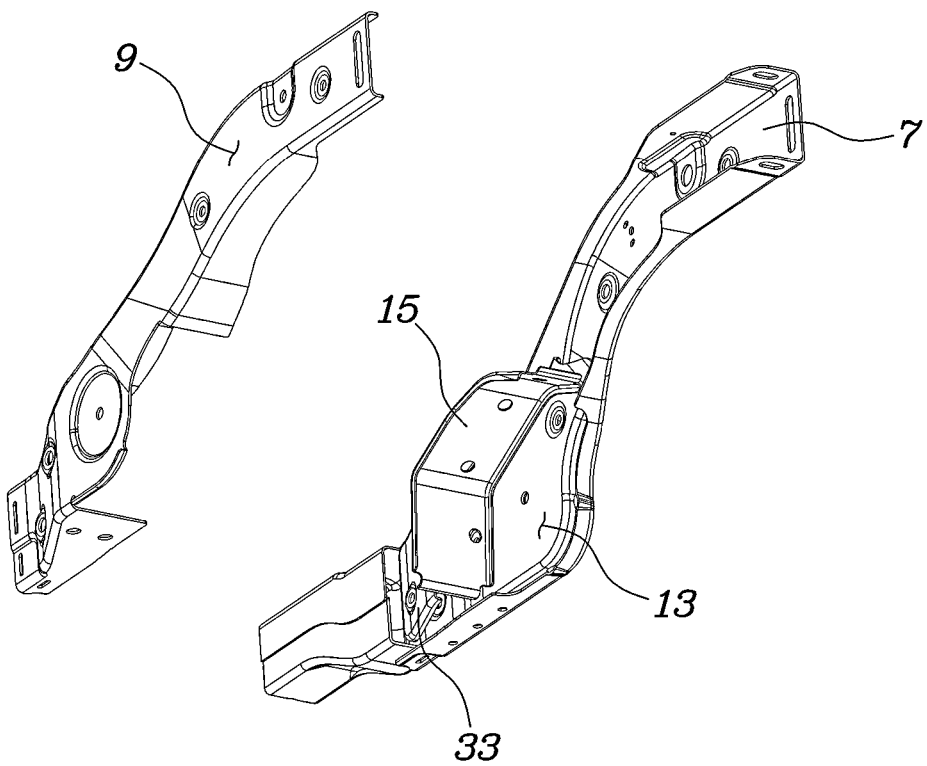
FIG. 9 illustrates a state after separating an outer panel from the part of the frame structure in FIG. 8.
Figure 10:
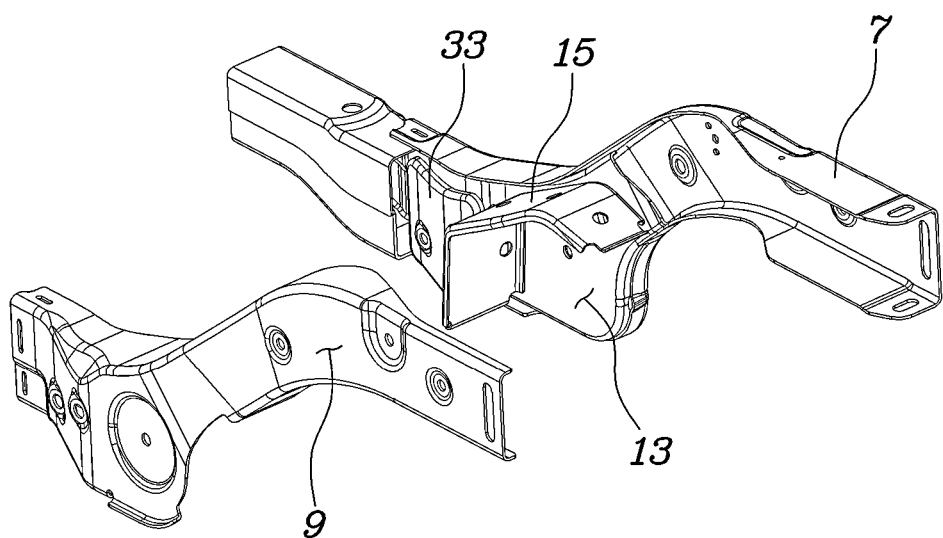
FIG. 10 is a top perspective view of the part of the frame structure in FIG. 9.
Figure 11:
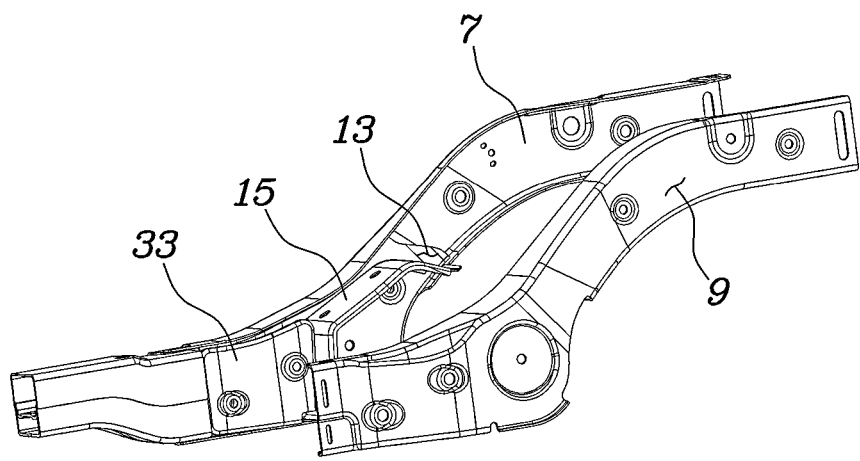
FIG. 11 is a left side view of the part of the frame structure in FIG. 10.
Figure 12:
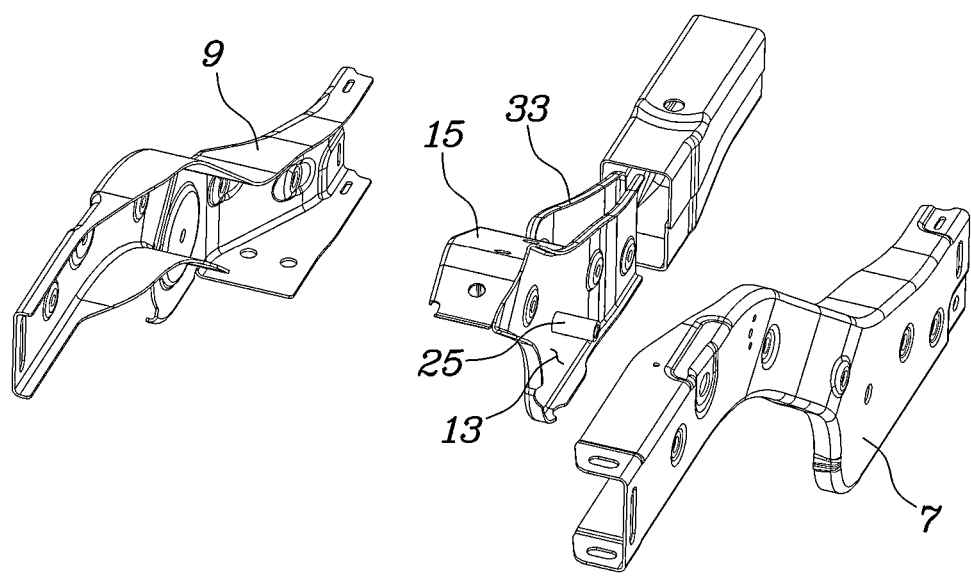
FIG. 12 is a right side perspective view of the part of the frame structure in FIG. 11, wherein the inner panel and the outer panel are spaced apart and with the first reinforcement member interposed therebetween.
Figure 13:
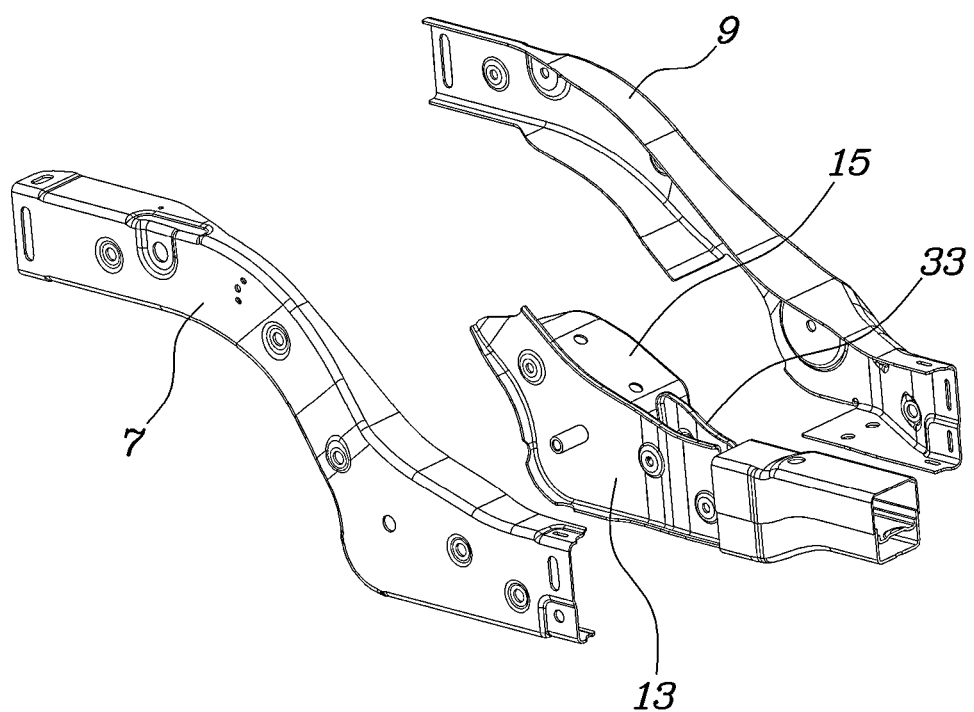
FIG. 13 is a different right side perspective view of the part of the frame structure in FIG. 12.
Figure 14:
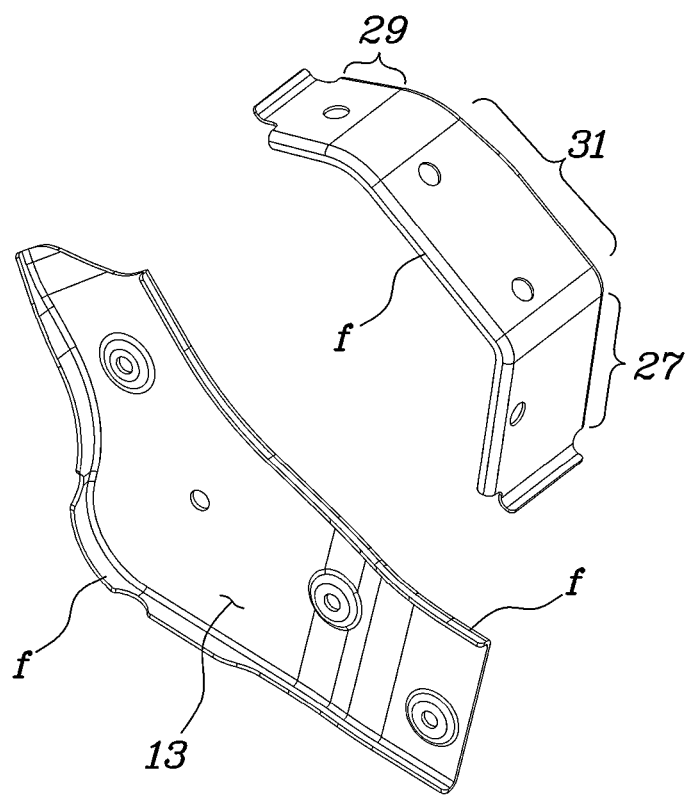
FIG. 14 illustrates a state after removing the first reinforcement member and the second reinforcement member only from the part of the frame structure in FIG. 13.
Figure 15:
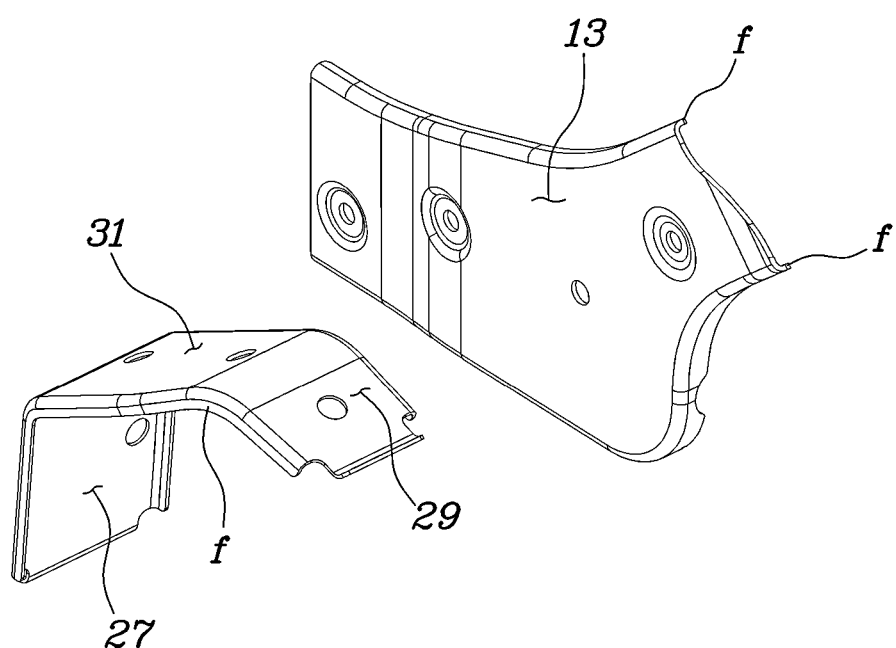
FIG. 15 is a different perspective view of the part of the frame structure in FIG. 14.

In the present embodiment, the first reinforcement member 13 is installed to form a long closed portion, i.e., the first closed portion in the closed section in a direction parallel to the inner panel 7 as illustrated in FIG. 6.

Figure 5:
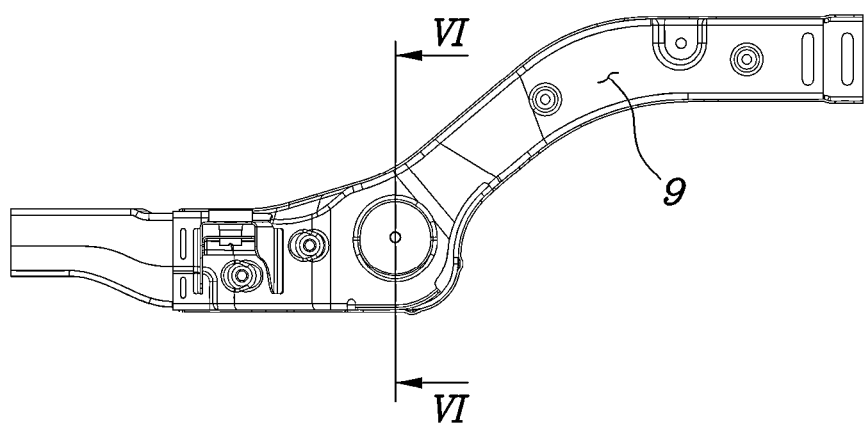
FIG. 5 illustrates a side member rear part of the frame structure seen in direction V in FIG. 2.

For reference, the shape of the closed section and the first closed portion is observed in FIG. 6 assuming that the side member 5 is cut away in the direction illustrated in FIG. 5.

The second reinforcement member 15 is installed to form a long closed portion, i.e., a second closed portion, in a direction perpendicular to the outer panel 9 and the inner panel 7, as shown in FIG. 6.

In other words, the first reinforcement member 13 forms a first closed portion together with the inner panel 7, and the second reinforcement member 15 forms another, second closed portion. As a result, the side member 5 has a section configured as illustrated in FIG. 5, thereby increasing the rigidity of the opening 11.

A nut 25, such as an elongate nut, extended nut, long nut, coupling nut, rod nut, connecting nut, etc. hereinafter "nut"), is provided and extends between the first reinforcement member 13 and the inner panel 7. A fastening bolt 23 for supporting an end of the rear suspension arm 17 is fastened to the nut 25.

In the present embodiment, the nut 25 is configured and lengthy enough to penetrate the inner panel 7 such that an end thereof is coupled to a side surface of the first reinforcement member 13.

The nut 25 is integrated with the inner panel 7 and the first reinforcement member 13 by welding or the like.

Therefore, the nut 25 plays the role of a pillar penetrating the first closed portion formed by the first reinforcement member 13 and the inner panel 7 such that the opening 11 of the side member 5 secures increased rigidity.

In addition, the nut 25 may have an end configured not to protrude into the space between the first reinforcement member 13 and the outer panel 9. Thus, when the rear suspension arm 17 is assembled between the first reinforcement member 13 and the outer panel 9, interference is prevented, thereby facilitating the assembly process.

In the present embodiment, the first reinforcement member 13 is configured in the shape of a flat plate formed longer than the second reinforcement member 15 in the forward/backward direction of the vehicle. The first reinforcement member 13 has flanges f provided on the upper and lower sides thereof and bent toward the inner panel 7.

The flanges f provided on the upper and lower sides of the first reinforcement member 13 make surface contact with the inner panel 7 and are coupled thereto so as to firmly form a closed portion.

The second reinforcement member 15 includes a front portion 27 coupled to the outer panel 9 and to the first reinforcement member 13 so as to block the front side of the opening 11. The second reinforcement member 15 also has a rear portion 29 coupled to the outer panel 9 and to the first reinforcement member 13 so as to block the rear side of the opening 11. The second reinforcement member 15 also has a middle portion 31 connecting the front portion 27 and the rear portion 29.

Each of the front portion 27, the middle portion 31, and the rear portion 29 of the second reinforcement member has the shape of a flat plate. With reference to the middle portion 31, each of the front portion 27 and the rear portion 29 is shaped to bend downward.

The second reinforcement member 15 has flanges f provided on both sides thereof and bent downward, respectively. One flange f makes surface contact with the first reinforcement member 13 and the other flange f makes surface contact with the outer panel 9 and is coupled thereto. Accordingly, together with the outer panel 9, the inner panel 7, and the first reinforcement member 13, the second reinforcement member 15 forms a second closed portion as illustrated in the upper side in FIG. 6.

The front end of the front portion 27 of the second reinforcement member 15 is bent forward, and the rear end of the rear portion 29 is bent backward and is coupled to the inside of the outer panel 9. The second reinforcement member thus ultimately plays the role of preventing external foreign materials from infiltrating into the closed section formed by the inner panel 7 and the outer panel 9 through the opening 11.

Accordingly, moisture and the like are prevented from infiltrating into the inner panel 7 and the outer panel 9 through the opening 11, thereby ultimately improving durability of the side member 5.

Further, a third reinforcement member 33 is installed in front of the front portion 27 of the second reinforcement member 15, is elongate in the forward/backward direction, and is spaced apart from the first reinforcement member 13.

When an impact resulting from a rear-end collision or the like is transferred through the side member 5 toward the front side via the opening 11, the third reinforcement member 33 supports the side member 5. The third reinforcement member 33 thus ultimately improves rigidity of the side member 5 and improves the performance of the vehicle for handling rear-end collisions.

The present disclosure described above may also be expressed as follows.

A vehicle frame structure according to an embodiment of the present disclosure includes an opening 11 provided in the lower side of a rear kickup portion Ku of a side member 5. A first reinforcement member 13 is configured to form a barrier in the upward/downward direction in the opening 11. A second reinforcement member 15 is configured to form a barrier in the transverse direction in the opening 11. The first reinforcement member 13 and the second reinforcement member 15 form a space in the opening 11 so as to rotatably support the front end of a rear suspension arm 17.

The side member 5 forms a closed section together with an inner panel 7 positioned inside the vehicle and an outer panel 9 positioned outside the vehicle, which are coupled to each other. The opening 11 is formed to partially open the closed section formed by the inner panel 7 and the outer panel 9. The first reinforcement member 13 forms a first closed portion with the inner panel 7 in the opening 11. The second reinforcement member 15 forms a second closed section with the outer panel 9, the inner panel 7, and the first reinforcement member 13 in the opening 11.

The first reinforcement member 13 is formed longer than the opening 11 in the forward/backward direction of the vehicle. The second reinforcement member 15 includes a front portion 27 configured to block the front side of the opening 11, a rear portion 29 configured to block the rear side of the opening 11, and a middle portion 31 configured to connect the front portion 27 and the rear portion 29.

The front portion 27, the middle portion 31, and the rear portion 29 of the second reinforcement member 15 are formed by successively bending flat plates, respectively, and both sides thereof are coupled to the outer panel 9 and the first reinforcement member 13, respectively.

A nut 25 is provided between the first reinforcement member 13 and the inner panel 7 and is coupled to a side surface of the first reinforcement member 13 through the inner panel 7. A fastening bolt 23 is fastened to the nut so as to penetrate a rear suspension arm 17 from the outer panel 9.

A third reinforcement member 33 is provided in front of the second reinforcement member 15, is elongate in the forward/backward direction, and is spaced apart from the first reinforcement member 13 in the transverse direction.

Although the present disclosure has been described and illustrated in conjunction with particular embodiments thereof, it should be apparent to those of ordinary skill in the art that various improvements and modifications may be made to the embodiments of the present disclosure without departing from the technical idea of the present disclosure defined by the appended claims.

What is claimed is:

1. A vehicle frame structure comprising:
    an inner panel connected to a rear side of a middle part of a side member so as to constitute an inside of a rear part of the side member;
    an outer panel connected to the rear side of the middle part of the side member and coupled to an outside of the inner panel so as to form a closed section with the inner panel and to constitute an outside of the rear part of the side member;
    an opening formed in lower sides of the inner panel and the outer panel so as to partially open the closed section formed by the inner panel and the outer panel such that a front end of a rear suspension arm can be inserted therein;
    a first reinforcement member provided in the opening so as to form a first closed portion with the inner panel; and
    a second reinforcement member provided in the opening so as to form a second closed portion with the inner panel, the outer panel, and the first reinforcement member and to isolate a space formed by the inner panel and the outer panel from an outer portion.

2. The vehicle frame structure of claim 1, wherein the opening is formed in a lower side of a kickup portion bent upwards from a portion of the rear part of the side member, which is connected to the middle part.

3. The vehicle frame structure of claim 1, wherein the first reinforcement member forms the first closed portion as a long first closed portion in a direction parallel to the inner panel.

4. The vehicle frame structure of claim 3, wherein the second reinforcement member forms the second closed portion as a long second closed portion in a direction perpendicular to the outer panel and the inner panel.

5. The vehicle frame structure of claim 3, wherein a nut is provided between the first reinforcement member and the inner panel and a fastening bolt is fastened thereto and configured to support an end of the rear suspension arm.

6. The vehicle frame structure of claim 5, wherein the nut has an end coupled to a side surface of the first reinforcement member through the inner panel.

7. The vehicle frame structure of claim 3, wherein the first reinforcement member is a flat plate shape and is longer than the second reinforcement member in a forward/backward direction of the vehicle, and wherein the first reinforcement member has flanges provided on upper and lower sides thereof and bent toward the inner panel, respectively.

8. The vehicle frame structure of claim 7, wherein the second reinforcement member comprises:
    a front portion coupled to the outer panel and the first reinforcement member so as to block the front side of the opening;

a rear portion coupled to the outer panel and the first reinforcement member so as to block the rear side of the opening; and a middle portion connecting the front portion and the rear portion.

9. The vehicle frame structure of claim 8, wherein each of the front portion, the middle portion, and the rear portion of the second reinforcement member has a flat plate shape and, with reference to the middle portion, each of the front portion and the rear portion is shaped to bend downward.

10. The vehicle frame structure of claim 9, wherein
the second reinforcement member has flanges provided on both sides thereof so as to bend downward, respectively,
one of the flanges makes surface contact with the first reinforcement member and another of the flanges makes surface contact with the outer panel, and
the front portion has a front end bent forward and the rear portion has a rear end bent backward.

11. The vehicle frame structure of claim 9, wherein a third reinforcement member is installed in front of the front portion of the second reinforcement member and is elongate in a forward/backward direction of the vehicle while being spaced apart from the first reinforcement member.

12. A vehicle frame structure comprising:
an opening provided in a lower side of a rear kickup portion of a side member;
a first reinforcement member configured to form a barrier in an upward/downward direction inside the opening; and
a second reinforcement member configured to form a barrier in a transverse direction inside the opening,
wherein the first reinforcement member and the second reinforcement member form a space inside the opening such that a front end of a rear suspension arm can be rotatably supported.

13. The vehicle frame structure of claim 12, wherein the side member forms a closed surface by coupling between an inner panel positioned so as to be inside a vehicle and an outer panel positioned so as to be outside the vehicle, wherein the opening is formed to partially open a closed section formed by the inner panel and the outer panel, wherein the first reinforcement member forms a first closed portion with the inner panel inside the opening, and wherein the second reinforcement member forms a second closed portion with the outer panel, the inner panel, and the first reinforcement member inside the opening.

14. The vehicle frame structure of claim 13, wherein the first reinforcement member is longer than the opening in a forward/backward direction of the vehicle, and wherein the second reinforcement member comprises a front portion configured to block the front side of the opening, a rear portion configured to block the rear side of the opening, and a middle portion configured to connect the front portion and the rear portion.

15. The vehicle frame structure of claim 14, wherein the front portion, the middle portion, and the rear portion of the second reinforcement member are successively bent flat plate shapes, respectively, and both sides thereof are coupled to the outer panel and the first reinforcement member, respectively.

16. The vehicle frame structure of claim 14, wherein a nut is provided between the first reinforcement member and the inner panel and is coupled to a side surface of the first reinforcement member through the inner panel, and wherein a fastening bolt is fastened to the nut and configured to penetrate a rear suspension arm from the outer panel.

17. The vehicle frame structure of claim 14, wherein a third reinforcement member is provided in front of the second reinforcement member and is elongate in the forward/backward direction while being spaced apart from the first reinforcement member in the transverse direction.

* * * * *